United States Patent

Ishioka et al.

[11] Patent Number: 5,934,011
[45] Date of Patent: *Aug. 10, 1999

[54] SEEDLING CULTURE MAT

[75] Inventors: Nobuya Ishioka, Tokyo; Tetsuhiko Yamaguchi, Kawasaki, both of Japan

[73] Assignee: Showa Denko K. K., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/090,860

[22] Filed: Jun. 5, 1998

[30] Foreign Application Priority Data

Jun. 6, 1997 [JP] Japan .................................. 9-165125

[51] Int. Cl.$^6$ .............................. A01C 1/04; A01G 17/06; A01G 9/02; A01B 79/00
[52] U.S. Cl. ................................ 47/1.01; 47/44; 47/65.9; 47/58.1; 47/56; 800/295; 800/320; 507/120
[58] Field of Search .................................. 47/1.01, 44, 56, 47/58.1, 65.9; 800/295, 320; 507/120

[56] References Cited

FOREIGN PATENT DOCUMENTS

| | | |
|---|---|---|
| 0 101 253 | 2/1984 | European Pat. Off. . |
| 0 470 524A1 | 2/1992 | European Pat. Off. . |
| 0 510 246A1 | 10/1992 | European Pat. Off. . |
| 40 30 3243 C1 | 7/1991 | Germany . |
| 63-138123 | 6/1988 | Japan . |
| 676823 A5 | 3/1991 | Switzerland . |
| WO 91/05459 | 5/1991 | WIPO . |
| WO 96/33601 | 10/1996 | WIPO . |

*Primary Examiner*—Robert A. Wax
*Assistant Examiner*—Tekchand Saidha
*Attorney, Agent, or Firm*—Sughrue, Mion, Zinn, Macpeak & Seas, PLLC

[57] ABSTRACT

A seedling culture mat comprising a mat which comprises a fibrous substrate or a water-soluble film or paper, a nonionic water-absorbing polymer in a film, tape, fiber or powder form which is anchored to the mat and seeds which are applied on the mat.

7 Claims, No Drawings

SEEDLING CULTURE MAT

BACKGROUND OF THE INVENTION

1. Field of the Invention

The present invention relates to a planting method which allows planting in the field of agriculture, planting of seedling cultures for vegetable and flowering plants, planting of housing sites, planting of slopes such as at woodland paths in mountains and river embankments, planting of common yards and public gardens, parks and streets, planting in deserts, and allows sowing, by easy and reliable operations, lawns for golf courses and grounds, planting at dry area, as well as green areas of housing sites, which method is hardly affected by sprinkling and rainfall and is resistant to dryness, as well as a seedling culture mat to be used therefor.

2. Description of the Related Art

Conventional seed sowing in gardens, for example, is accomplished mainly by hand or machine. In addition, it has recently become common to utilize plant seeds attached to resin cloths or the like for planting onto steep, wide slopes such as at housing sites or woodland paths.

Other methods for planting employ seedling culture mats, which comprise plant seeds anchored to various types of supports in a similar manner, as described in Japanese Unexamined Patent Publications No. 6-169636, No. 8-228514, No. 8-187012, No. 8-214721 and No. 8-228512. Other seedling culture mats are used in combination with water-absorbing polymers, as described in Japanese Unexamined Patent Publications No. 62-210907, No. 63-197720, No. 1-148111 and No. 2-16216, and Japanese Unexamined Utility Model Publication No. 2-145008.

Planting by these conventional methods of the prior art tends to result in uneven distribution of the seeds, and planting with mechanical seeders or seedling culture mats has generally been difficult to apply to small areas and complicated surfaces. As additional problems, insufficient sprinkling or rainfall after seeding results in a low budding rate, while the inferior water-absorbing power of the plant seeds with respect to the water-absorbing power of the water-absorbing polymer can cause the budding rate to be low, requiring a longer number of days until budding. Conventional water-absorbing polymers may impair budding or growth, impede air or water permeability, and have low durability.

A particular problem is that withering of the budded young plants occurs if water dispersion cannot be achieved or if a drought condition continues after the plant seeds have budded. Water-absorbing polymers heretofore used generally have strong water-absorbing powers and can therefore store large amounts of water, but the plants cannot be provided with the water which has already been absorbed by the water-absorbing polymers, and the roots avoid the water-absorbing polymer and withering occurs despite sufficient water in the water-absorbing polymer.

SUMMARY OF THE INVENTION

It is an object of the present invention to provide a seedling culture mat containing a water-absorbing polymer, which allows growth of budded young plants, without withering, with water stored in the water-absorbing polymer, and is hardly affected by sprinkling and rainfall thereafter, to thus provide excellent budding and growth rates and ease of handling.

As a result of diligent research carried out in order to more reasonably and effectively overcome the aforementioned problems, the present inventors have completed the present invention upon succeeding in solving these problems based on the finding that non-ionic water-absorbing polymers including N-vinylamide-based polymers used as water-absorbing polymers have no adverse effect on the growth of plants, and that young plants can utilize the absorbed water during periods of drought or dryness.

In other words, the present invention provides a seedling culture mat comprising (a) a mat which comprises a fibrous substrate or a water-soluble film or paper, (b) a nonionic water-absorbing polymer in a film, tape or powder form which is anchored to the mat and (c) seeds which are applied on the mat.

DESCRIPTION OF THE PREFERRED EMBODIMENTS

According to the invention, "fibrous substrate" refers to thin pieces of rice straw, wheat straw, hay or timber, pulps including wood linter, etc., bark, paper, peat moss, short natural fibers or synthetic fibers, preferably biodegradable pulp and peat moss with high water-absorbing properties, compressed into boards, sheets, tapes or strings either with or without natural or synthetic resins as binders. In the invention, a water-soluble film or paper may also be used instead of or in combination with the fibrous substrate.

They may be used as single layers or they may be laminated together with the plant seeds inserted between them. When used as one layer, the plant seeds may be either attached with a binder or they may be inserted and held within the layer. Alternatively, another water-soluble film or paper layer may be attached with the seeds inserted and held between them. These may also be mixed with a calcined foaming rock powder such as vermiculite or pearlite, or with fertilizer or another additive.

As the nonionic water-absorbing polymer to be used for the invention, there may be mentioned vinylamide-based polymers such as acrylamide-based polymers and N-vinylamide-based polymers, of which N-vinylamide-based polymers comprising units derived from an N-vinylamide represented by the following formula (1) are preferred.

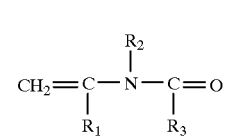

(1)

wherein $R_1$ and $R_2$ each independently represent hydrogen or methyl and $R_3$ represents hydrogen, methyl, ethyl or isopropyl, or $R_2$ and $R_3$ together form an alkylene group of 3–5 carbon atoms.

As specific examples thereof, there may be mentioned N-vinylacetamide, N-methyl-N-vinylacetamide, N-vinylformamide, N-methyl-N-vinylformamide, N-vinyl-α-pyrrolidone, N-vinylisobutyramide, among which N-vinylacetamide is particularly preferred.

The N-vinylamides may be used alone or in combination of two or more thereof.

The N-vinylamide-based polymer to be used for the invention may also be a copolymer composed mainly of an N-vinylamide. The N-vinylamide-based polymers may preferably contain 60 mole percent, especially 70 mole percent of the units derived from an N-vinylamide.

As examples of ionic monomers which can be copolymerized with N-vinylamides there may be mentioned (meth)

acrylic acid, maleic acid, itaconic acid, 2-acrylamide-2-methyl-propanesulfonic acid, 2-acrylamide ethanesulfonic acid, 2-methacrylamide ethanesulfonic acid, 3-methacrylamide propanesulfonic acid, methyl acrylate sulfonic acid, methyl methacrylate sulfonic acid, 2-ethyl acrylate sulfonic acid, 3-propyl acrylate sulfonic acid, 3-propyl methacrylate sulfonic acid, 2-methyl-3-propyl acrylate sulfonic acid, 2-methyl-3-propyl methacrylate sulfonic acid, 1,1'-dimethyl-2-ethyl acrylate sulfonic acid, 1,1'-dimethyl-2-ethyl methacrylate sulfonic acid, and their salts.

As examples of non-ionic monomers which can be copolymerized with N-vinylamides there may be mentioned (meth)acrylic acid esters such as methylacrylate, ethylacrylate, propylacrylate, 2-hydroxyethylacrylate, methyl methacrylate, ethyl methacrylate, 2-hydroxyethyl methacrylate and 2-hydroxypropyl methacrylate; (meth) acrylamides and N-alkyl-substituted (meth)acrylamides such as acrylamide, methacrylamide and N,N-dimethylacrylamide; vinyl ketones such as methyl vinyl ketone and ethyl vinyl ketone; (meth)acrylonitrile; carboxylic vinyl esters such as vinyl acetate and vinyl butyrate; and vinyl ethers such as methyl vinyl ether, ethyl vinyl ether, as well as allyl alcohol, maleic anhydride and dimethyl maleate.

The nonionic polymer used in the present invention may comprise units derived from an ionic monomer in an amounts of not more than 20 mole percent of the polymer so that the polymer is substantially nonionic.

The proportion of the ionic monomer in the copolymer may be 20 mole percent or less, and preferably 10 mole percent or less. If the proportion of ionic monomer in the copolymer is no greater than 20 mole percent the risk of impeding budding and growth can be reduced.

Also, the proportion of the non-ionic monomer other than N-vinylamides in the copolymer may be a maximum of 30 mole percent, and preferably no greater than 20 mole percent, considering the utilization of water absorbed by the water-absorbing polymer and the durability and cost of the polymer, though there is no need to consider a risk of impeding budding or growth by ionic property.

The N-vinylamide-based polymer must be a three-dimensional crosslinked polymer, and it may be produced, for example, by polymerization of N-vinylacetamide with a compound having at least 2 copolymerizable unsaturated groups in the molecule (a "crosslinking agent") and in some cases with a copolymerizable monomer, using a radical polymerization initiator under oxygen-free conditions.

The polymerization process is not necessarily restricted, and conventional methods such as aqueous solution polymerization or reverse phase suspension polymerization may be employed for production of crosslinked sodium polyacrylate, specific examples of which are described in Japanese Unexamined Patent Publications No. 3-223304, No. 4-230250 and No. 4-346833.

As concrete examples of crosslinking agents which may be employed for production of the N-vinylamide-based polymer there may be mentioned N,N'-methylenebisacrylamide, triethyleneglycol (meth)acrylate, pentaerythritol tri(meth)acrylate, divinylbenzene, N,N-alkylenebis (N-vinylacetamide) compounds (for example, N',N'-1,4-butylenebis(N-vinylacetamide) or N,N'-diacetyl-N,N'-divinyl-1,4-bisaminomethylcyclohexane), pentaerythritol triallyl ether and tetraallyloxyethane, among which any one or, if necessary, two or more may be used.

The amount of these crosslinking agents to be used may generally be in the range of $2 \times 10^{-4}$ to 10 mole percent, and preferably $5 \times 10^{-4}$ to 2 mole percent based on the monomer component.

The polymerization initiator used for production of the crosslinked polymer may be any conventionally known peroxide, organic or inorganic peroxy acid or salt thereof, or a redox-type with an azobis compound alone or in combination with a peroxide initiator and reducing agent; preferred among these are azobis initiators such as azobis(2-aminodipropane) dihydrochloride and 2,2'-azobis [2-(2-imidazoline-2-yl)propane] dihydrochloride.

The amount of the polymerization initiator to be used is not critical but may preferably be 0.0005–5 mole percent, and most preferably 0.005–0.5 mole percent, based on the monomer component. The polymerization initiation temperature may normally be about −10 to 80° C.

When the crosslinking degree of the poly-N-vinylamide-based polymer is excessively high the water absorption will be reduced, and if the crosslinking degree is too low the water-absorbing property will not be sufficiently expressed.

These N-vinylamide-based polymers may be anchored to a seedling culture mat in the form of a film, tape, fiber or powder. There are no restrictions on the method of anchoring, and for example, the water-absorbing polymer tape or fibers may be inserted into the mat, or for powders, a water-soluble resin paste may be used for anchoring to prevent spillage from the mat, or the powder may be laminated as a film.

The N-vinylamide-based polymer used according to the invention does not hinder budding of plant seeds.

Consequently, the plant seeds remain stable without budding while the seedling culture mat is dry, but once contacted with water, the water supplied to the N-vinylamide-based polymers is rapidly absorbed while the plant seeds simultaneously absorb water and begin to bud.

Most common water-absorbing polymers not only have a large water-absorbing capacity but also a very high water absorbing power, and hence absorbed water tends to be retained in the water-absorbing polymer without being supplied elsewhere. After budding, therefore, competition occurs between the water absorption of the young plant and the water absorbing power of the polymer, such that the young plant may not be supplied with water, and thus the young plant may die of withering although the seedling culture mat as a whole contains sufficient water.

In contrast, with N-vinylamide-based polymers the water-absorbing power is lower than that of other water-absorbing polymers, and therefore the water absorbed and retained thereby can be supplied to the young plant, so that the use of the seedling culture mat according to the invention renders the young plant less susceptible to the influence of lack of sprinkling and rainfall, and increases its resistance against drought. Since N-vinylamide-based polymers have a high durability, their water-retaining action lasts for a long time and the plant has high resistance against drought after growth.

The method for producing the seedling culture mat of the invention is not particularly restricted, and for example, for plant seeds which require light for budding, they may be attached with an adhesive or water-soluble resin paste on the mat surface, or embedded in the mat.

For plant seeds which require no light for budding or which require shielding from light, a means may be constructed whereby the plant seeds are attached to the underside of the seedling culture mat, or the plant seeds are sandwiched between 2 mats, or the seedling culture mat may be laid out and covered to an appropriate thickness with soil.

Naturally, for simultaneous sowing of different plant seeds, they may be attached and inserted in the seedling culture mat depending on the characteristics of the individual plant seed types.

The thickness of the seedling culture mat prepared in this manner is not particularly restricted and may be appropriately selected based on the purpose, the location of use and the characteristics of the plant seeds, but the thickness may generally be about 0.01–50 mm, and preferably about 0.05–10 mm.

The optimum ranges for the content of the N-vinylamide-based polymer in the seedling culture mat will differ depending on the properties and form of the fibrous substrate or water-soluble film or paper, the properties provided by the degree of crosslinking of the polymer, the conditions at the location of use and the type of plant seeds, and because of such a wide acceptable range for the content there is no problem if it is slightly outside of the optimum range; however, for most cases appropriate contents are from 10 to 1000 g, and preferably 50 to 500 g per 1 $m^2$ of the seedling culture mat.

There are virtually no restrictions on the plant seeds which may be used for the invention, but they are usually seeds for planting of lawns, pastures, and woody and decorative areas or are seeds of edible and pharmaceutical flowering plants, vegetables, grains, soybeans, etc. They may be selected depending on the location and purpose of use.

The invention will be further illustrated below by way of non-limitative examples.

EXAMPLE 1

To seedling culture mats with a thickness of 2 mm prepared by adhering 100 g/$m^2$ of an N-vinylamide-based water-absorbing polymer to sheets made of wood pulp through a natural paste, there were attached cabbage seeds at 80 seeds per plant bed (25 cm×25 cm), using a natural paste in a uniform manner. The mats were laid onto 16 plant beds (25 cm ×25 cm) containing a mixture of equivalent amounts of peat moss and vermiculite and then, after using the same mixture for covering to a thickness of 2 cm, the mats were provided with an adequate sprinkling with water and allowed to stand in an area protected from rain.

The N-vinylamide-based water-absorbing polymer used here was obtained using N-vinylacetamide and N,N'-diacetyl-N,N'-divinyl-1-1,4-bisaminomethylcyclohexane as the crosslinking agent.

Upon measuring the budding rate on the 7th day, the average value was found to be about 96%. After allowing the mats to stand without sprinkling and observing the state of the young plants after 2 weeks, healthy growth was confirmed for almost all of the plants.

No difference was found with plants for which sprinkling was continued after budding to prevent withering from dryness.

COMPARATIVE EXAMPLE 1

For comparison, seedling culture mats were prepared using a commercially available polyethylene glycol-based water-absorbing polymer (Aquacork (trademark), manufactured by Sumitomo Fine Chemicals Inc.) instead of the water-absorbing polymer of Example 1, and upon budding tests and dryness tests in exactly the same manner, the budding rate was virtually identical at about 93%, but after 2 weeks the proportion of healthy plants was much lower at only 42% of the budded plants, and since healthy growth was observed in virtually all of the plants for which sprinkling had been continued to prevent blight from dryness, it was concluded that almost all of the blighted or weakened plants resulted from inadequate moisture.

EXAMPLE 2

A seedling culture mat containing a prescribed amount of an N-vinylamide-based water-absorbing polymer (the same as Example 1 except for the content (in terms of weight percent of the water-absorbing polymer based on the weight of the wood pulp sheet)) was packed into a plastic pot. After allowing adequate water absorption of liquid fertilizer from the bottom, the mat was allowed to stand for 2 days for elimination of the excess moisture, and upon sowing grass, the pot was shielded from light for 7 days to achieve uniform initial growth. Designating the 7th day after sowing as day 0 of growth, the water-retaining effect in the absence of water sprinkling was confirmed, and the state of growth of the grass was examined.

Table 1 shows the state of wilting of the plants. For comparison, a pot was prepared which was packed with a seedling culture mat containing no water-absorbing polymer.

The state of wilting of the plants is listed in Table 1.

TABLE 1

| Water-absorbing polymer content (wt %) | State of wilting | | | | | | |
|---|---|---|---|---|---|---|---|
| | Day 17 | Day 19 | Day 21 | Day 23 | Day 25 | Day 27 | Day 29 |
| 0.2 | − | + | + | ++ | +++ | +++ | +++ |
| 0.5 | − | − | − | ++ | ++ | +++ | +++ |
| 1.0 | − | − | − | + | + | ++ | ++ |
| 2.0 | − | − | − | − | + | + | + |
| 0.0*1 | − | − | − | − | − | − | − |
| 0.0*2 | + | + | ++ | +++ | +++ | +++ | +++ |

Wilting (average n = 3)
−: virtually no withering found
+: wilting of leaf tips/10% withering
++: 10–70% withering
+++: over 70% withering
*1: sprinkling
*2: no sprinkling

EXAMPLE 3

A seedling culture mat was prepared by using a non-woven vegetable fiber sheet and a water-soluble film. 75 g/$m^2$ of the same N-vinylamide-based water-absorbing polymer as used in Example 1 and 15 g/$m^2$ of Bermuda grass seeds were applied therebetween and they were integrally adhered by a natural paste.

Then, the procedures as described in Example 1 were repeated except that the thus-obtained seedling culture mat was used instead of the mats as used in Example 1.

The results were similar to those obtained in Example 1

Because the present invention employed N-vinylamide-based polymers as the water-absorbing polymers for seedling culture mats, which polymers are considered to have weaker water-absorbing power than conventionally used water-absorbing polymers, it is possible to supply the absorbed water to young plants whose roots had not penetrated the soil to a sufficient depth.

The seedling culture mats are therefore highly effective for young plants on slopes, housing sites, mountain areas, etc. or in large plant habitats, where it is difficult to supply water when water is required after budding.

We claim:

1. A seedling culture mat comprising:
   (a) a mat which comprises a fibrous substrate or a water-soluble film or paper;

(b) a nonionic water-absorbing vinylamide-based polymer in a film, tape, fiber or powder form which is anchored to the mat; and (c) seeds which are applied on the mat.

2. The seedling culture mat according to claim 1, wherein the vinylamide-based polymer is a cross-linked polymer.

3. The seedling culture mat according to claim 1, wherein the vinylamide-based polymer comprises at least 60 mole percent of units derived from an N-vinylamide represented by the following formula (1)

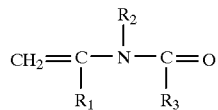
(1)

wherein $R_1$ and $R_2$ each independently represent hydrogen or methyl and $R_3$ represents hydrogen, methyl, ethyl or isopropyl, or $R_2$ and $R_3$ together form an alkylene group of 3 to 5 carbon atoms.

4. The seedling culture mat according to claim 3, wherein the vinylamide-based polymer is a cross-linked polymer.

5. The seedling culture mat according to claim 3, wherein the vinylamide-based polymer is an N-vinylacetamide-based polymer.

6. The seedling culture mat according to claim 5, wherein the vinylamide-based polymer is a cross-linked polymer.

7. The seedling culture mat according to claim 1, wherein the fibrous substrate comprises thin pieces of rice straw, wheat straw, hay, timber, wood pulp, bark, paper, peat moss or short natural or synthetic fibers, and the mat is in the form of a board, sheet, tape or string.

* * * * *